US012183296B2

(12) United States Patent
Chang et al.

(10) Patent No.: US 12,183,296 B2
(45) Date of Patent: Dec. 31, 2024

(54) DISPLAY, METHOD FOR CONTROLLING DISPLAY, AND DISPLAY SYSTEM

(71) Applicant: Optoma Corporation, New Taipei (TW)

(72) Inventors: Sheng-Feng Chang, New Taipei (TW); Ya-Yi Wang, New Taipei (TW)

(73) Assignee: Optoma Corporation, New Taipei (TW)

( * ) Notice: Subject to any disclaimer, the term of this patent is extended or adjusted under 35 U.S.C. 154(b) by 0 days.

(21) Appl. No.: 18/528,798

(22) Filed: Dec. 5, 2023

(65) Prior Publication Data

US 2024/0242686 A1 Jul. 18, 2024

(30) Foreign Application Priority Data

Jan. 12, 2023 (CN) ........................ 202310039283.X

(51) Int. Cl.
*G09G 3/36* (2006.01)

(52) U.S. Cl.
CPC ....... *G09G 3/36* (2013.01); *G09G 2320/0626* (2013.01); *G09G 2320/0666* (2013.01);
(Continued)

(58) Field of Classification Search
CPC ...... G09G 3/20; G09G 3/36; G09G 2330/022; G09G 2354/00; G09G 2320/0666; G09G 2380/06; G09G 2320/103; G09G 2330/021; G09G 2370/022; G09G 2320/106; G09G 2320/0626
See application file for complete search history.

(56) References Cited

U.S. PATENT DOCUMENTS 11,360,236 B1 6/2022 Khedekar
11,589,116 B1 * 2/2023 Omar .................... G06V 20/44
(Continued)

FOREIGN PATENT DOCUMENTS

CN 102158636 3/2013
CN 107111992 8/2017
(Continued)

OTHER PUBLICATIONS

"Search Report of Europe Counterpart Application", issued on May 6, 2024, p. 1-p. 15.

*Primary Examiner* — Doon Y Chow
(74) *Attorney, Agent, or Firm* — JCIPRNET

(57) ABSTRACT

A display, a method for controlling the display, and a display system are provided. The method for controlling the display includes the following steps. analyzing an image after receiving image information to determine whether there is at least one object in the image; obtaining a block corresponding to each object in each of multiple frames of the image, and identifying object information in each block, wherein the object information includes an object type, reference point coordinates, and a frame time; obtaining a number of a target object according to the object type; calculating a moving speed of each target object according to the frame time and the reference point coordinates; and controlling brightness of a light source of the display according to the number and the moving speed. The disclosure can dynamically adjust the brightness of the light source according to different conditions.

19 Claims, 5 Drawing Sheets

(52) U.S. Cl.
CPC . *G09G 2330/021* (2013.01); *G09G 2370/022* (2013.01); *G09G 2380/06* (2013.01)

(56) References Cited

U.S. PATENT DOCUMENTS

| | | | | |
|---|---|---|---|---|
| 12,056,949 | B1 * | 8/2024 | Sun | G06F 18/2178 |
| 2005/0068300 | A1 | 3/2005 | Wang et al. | |
| 2010/0265405 | A1 | 10/2010 | Toshima et al. | |
| 2010/0313214 | A1 | 12/2010 | Moriya et al. | |
| 2017/0287225 | A1 * | 10/2017 | Powderly | G06F 3/04815 |
| 2019/0122082 | A1 | 4/2019 | Cuban et al. | |
| 2019/0138786 | A1 * | 5/2019 | Trenholm | G06F 18/241 |
| 2019/0237028 | A1 | 8/2019 | Yashiki | |
| 2020/0097702 | A1 * | 3/2020 | Saitou | G06V 20/58 |
| 2020/0389642 | A1 * | 12/2020 | Xu | G06T 7/521 |
| 2021/0035524 | A1 | 2/2021 | Chun et al. | |
| 2021/0133810 | A1 | 5/2021 | Macneille et al. | |
| 2021/0209388 | A1 * | 7/2021 | Ciftci | G06V 10/764 |

FOREIGN PATENT DOCUMENTS

| | | |
|---|---|---|
| CN | 104835061 | 6/2018 |
| CN | 109019206 | 12/2018 |
| CN | 110033296 | 7/2019 |
| CN | 110766451 | 2/2020 |
| CN | 108337556 | 5/2021 |
| CN | 113221002 | 8/2021 |
| CN | 114475429 | 5/2022 |
| TW | 201417090 | 5/2014 |
| TW | M624038 | 3/2022 |
| TW | I766747 | 6/2022 |

* cited by examiner

DISPLAY, METHOD FOR CONTROLLING DISPLAY, AND DISPLAY SYSTEM

CROSS-REFERENCE TO RELATED APPLICATION

This application claims the priority benefit of China application serial no. 202310039283.X, filed on Jan. 12, 2023. The entirety of the above-mentioned patent application is hereby incorporated by reference herein and made a part of this specification.

BACKGROUND

Technical Field

The disclosure relates to a display, a method for controlling the display, and a display system with the display.

Description of Related Art

Electronic billboards are digital displays such as liquid crystal display (LCD), plasma display, and light-emitting diode (LED) display as media to display content such as videos, animations, pictures, and texts. Based on different venues, the multimedia audio-visual contents displayed on the electronic billboards may include various styles of texts, pictures, or video carousels for information announcements, educational promotions, etc. Accordingly, the electronic billboards have become the optimal information dissemination media platforms and are also marketing platforms tailored to local conditions. However, how to strike a balance between attracting the masses and saving energy is one of the topics currently being discussed.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a display, a method for controlling the display, and a display system with the display, which can dynamically adjust the brightness of a light source of the display according to different conditions.

Other objectives and advantages of the disclosure may be further understood from the technical features disclosed in the disclosure.

In order to achieve one, a part, or all of the above objectives or other objectives, a method for controlling a display is suitable for being executed by a processing apparatus of the display. The method for controlling the display includes the following steps. Image information is received. An image is generated according to the image information. The image has multiple frames. The image is analyzed to determine whether there is at least one object in the image. A block corresponding to an object in each frame is obtained according to the frames of the image, and object information in each block is identified. The object information includes an object type, reference point coordinates, and a frame time. A number of a target object is obtained according to the object type. The target object corresponding to the object type of the object is a target type. A moving speed of each target object is calculated according to the frame time and the reference point coordinates. Brightness of a light source of the display is controlled according to the number and the moving speed of the at least one target object.

In an embodiment of the disclosure, after obtaining the block corresponding to the object in each frame, the method for controlling the display further includes marking the object type of the block.

In an embodiment of the disclosure, the method for controlling the display further includes the following steps. Color information of a block corresponding to each target object is identified. The brightness of the light source of the display is controlled according to the color information.

In an embodiment of the disclosure, the object information further includes a length of the block, and the method for controlling the display further includes the following steps. A height of each target object is calculated according to the length of the block corresponding to each target object. The brightness of the light source of the display is controlled according to the height.

In an embodiment of the disclosure, the method for controlling the display further includes the following steps. Sound data is received through a sound sensor. An ambient volume is calculated according to the sound data through the processing apparatus. The brightness of the light source of the display is controlled according to the ambient volume.

In an embodiment of the disclosure, the step of controlling the brightness of the light source of the display further includes the following steps. Whether the number and the moving speed satisfy a limiting condition is determined. The brightness of the light source is increased in response to the limiting condition being satisfied. The brightness of the light source is decreased in response to the limiting condition not being satisfied. The limiting condition includes a speed range of the moving speed and a minimum number restriction of the number.

In an embodiment of the disclosure, the step of controlling the brightness of the light source of the display includes the following steps. A dimming command is sent to a power supply, so that power supply controls the brightness of the light source. The dimming command depends on the number and the moving speed.

In an embodiment of the disclosure, the method for controlling the display further includes the following steps. A shutdown command is sent to the power supply according to at least one of the number of the target object and the frame time, so that power supply stops supplying power to the light source to shut down the light source.

In an embodiment of the disclosure, the object information further includes a length and a width of the block, and the method for controlling the display further includes the following steps. A height of each target object is calculated according to the length of the block corresponding to each target object. Color information of the block corresponding to each target object is identified according to the reference point coordinate, the length, and the width. An ambient volume is calculated based on sound data. The brightness of the light source of the display is controlled according to the number, the moving speed, the height, the color information, and the ambient volume.

The display of the disclosure includes an image sensor, a light source, and a processing apparatus. The image sensor is used to generate image information. An image is generated according to the image information and the image has multiple frames. The processing apparatus is coupled to the image sensor and the light source. The processing apparatus is used to execute the method for controlling the display.

The display system of the disclosure includes a cloud server and at least one display. The cloud server is used to set at least one limiting condition and make a push notification to transmit the at least one limiting condition to the at least one display. The at least one display is used to receive the limiting condition. The at least one display includes an image sensor, a light source, and a processing apparatus. The image sensor is used to generate image information. An image is generated according to the image information and the image has multiple frames. The processing apparatus is coupled to the image sensor and the light source. The processing apparatus is used to execute the method for controlling the display.

Based on the above, the embodiments of the disclosure have at least one of the following advantages or functions. In the embodiments of the disclosure, the brightness of the light source may be dynamically adjusted according to the number and the moving speed of the target object, etc. The light source is adjusted to improve the attraction effect in the case where the number and the moving speed of the target object satisfies the limiting condition, and the light source enters a power saving mode in the case where the number and the moving speed of the target object does not satisfy the limiting condition.

In order for the features and advantages of the disclosure to be more comprehensible, the following specific embodiments are described in detail in conjunction with the drawings.

Other objectives, features and advantages of the disclosure will be further understood from the further technological features disclosed by the embodiments of the disclosure wherein there are shown and described preferred embodiments of the disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

The aforementioned and other technical contents, features, and effects of the disclosure will be clearly presented in the following detailed description of a preferred embodiment with reference to the drawings. Directional terms such as upper, lower, left, right, front, or rear mentioned in the following embodiments are only directions with reference to the drawings. Accordingly, the directional terms are used to illustrate and not to limit the disclosure. Moreover, the term "coupling" mentioned in the following embodiments may refer to any direct or indirect connection means.

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
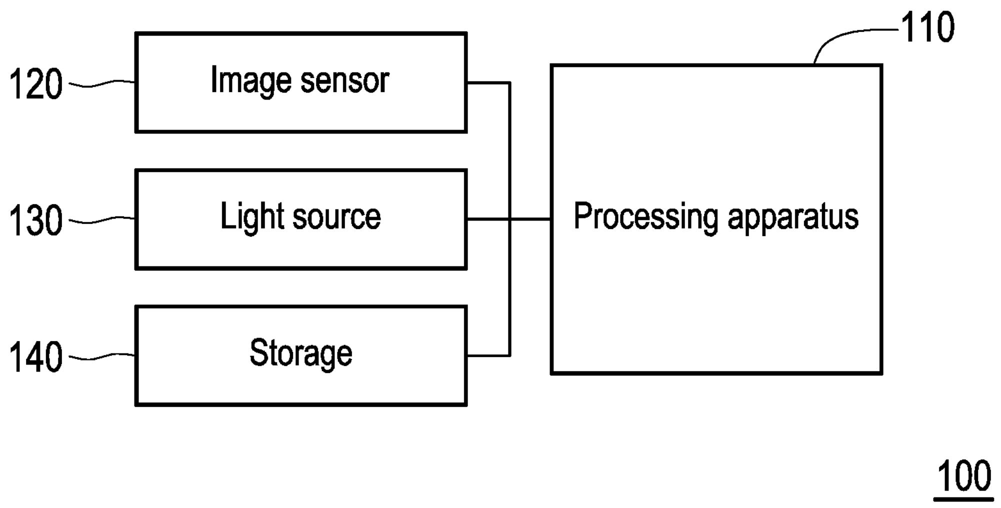
FIG. 1 is a block diagram of a display according to an embodiment of the disclosure.

FIG. 1 is a block diagram of a display according to an embodiment of the disclosure. Please refer to FIG. 1. A display 100 includes a processing apparatus 110, an image sensor 120, a light source 130 and a storage 140. The light source 130 of the display 100, for example, is a backlight module, light emitting diodes, etc. The processing apparatus 110 is coupled to the image sensor 120, the light source 130, and the storage 140.

The display 100, for example, is a liquid crystal display (LCD), plasma display, light-emitting diode (LED) display and projector, the disclosure does not limit the type of the display.

The processing apparatus 110 includes one or more processors. The processor is, for example, a central processing unit (CPU), a physical processing unit (PPU), a programmable microprocessor, an embedded control chip, a digital signal processor (DSP), an application specific integrated circuits (ASIC), or other similar devices. The processing apparatus 110 may control the operations of the image sensor 120 and the light source 130.

The image sensor 120 may be a camera, like a video camera, or an image captured device with a charge coupled device (CCD) or a complementary metal oxide semiconductor transistor (CMOS).

In an embodiment, the backlight module is a light source 130 of the display 100. The display 100 further comprises a display panel. The backlight module is used to provide an illumination beam to the display panel of the display 100. The light source 130 may comprises LEDs or Laser diodes. The display panel is, for example, a liquid crystal display (LCD) panel. The display panel converts the illumination beam into an image beam. By configuring the light source 130 is capable of projecting the illumination beam to the display panel, the image beam is projected out of the display 100 to form an image, so as to transmit the image with a multimedia visual content to be projected to the eyes of a user. In the other embodiments, the light source of the display 100 may be light emitting diodes (LEDs), laser diodes (LDs), or organic light-emitting diodes (OLEDs).

The storage 140 may be one or more types of fixed or removable random access memory (RAM), read-only memory (ROM), flash memory, secure digital card, hard disk, other similar devices, or a combination of the devices. At least one program is stored in the storage 140. After the at least one program is installed, the processing apparatus 110 may execute the at least one program for controlling the display 100.

Figure 2:
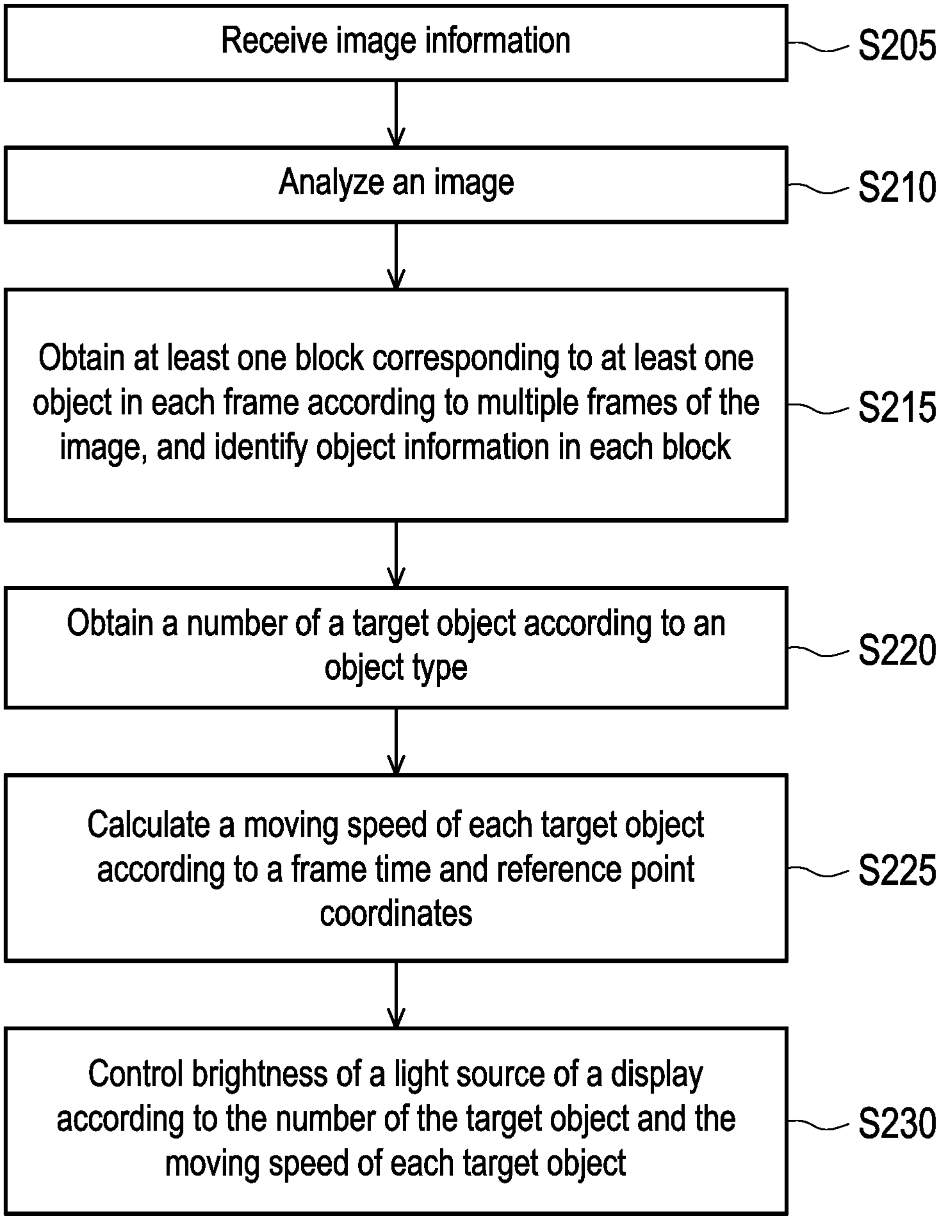
FIG. 2 is a flowchart of a method for controlling a display according to an embodiment of the disclosure.

FIG. 2 is a flowchart of a method for controlling a display according to an embodiment of the disclosure. Please refer to FIG. 1 and FIG. 2 at the same time. In Step S205, the processing apparatus 110 receives image information from the image sensor 120. Here, the image information is, for example, an image signal. The processing apparatus 110 generates an image according to the content of the image information. The image has multiple frames. In the embodiment, the image sensor 120 is, for example, disposed at a position adjacent to the display panel of the display 100 and is used to sense an environmental image in front of the display 100. The image sensor 120 generates the image information corresponding to the environmental image and transmits the image information to the processing apparatus 110. In an embodiment, the image sensor 120 may also be a camera, a monitor, etc. disposed at the position of the display 100, such as a monitor that is originally disposed in a library or a shopping mall.

In Step S210, the processing apparatus 110 analyzes the image to determine whether there is at least one object in the image. Here, a machine learning model may be designed to identify features in the images, so as to perform object detection. The machine learning model is, for example, a convolutional neural network (CNN) machine learning model. For example, for the machine learning training, image data of public places, libraries, commercial building lobbies, offices, conference rooms, etc. may be collected in advance from public media platforms, and after marking features of an object to be trained in each frame of the image data, the machine learning model is trained using the image data with the marked features. Here, the machine learning model may, for example, implement object detection by adopting YOLOv7 algorithm.

In an embodiment, the machine learning model is set in the storage 140 of the display 100 in the form of an application package (for example, an Android application package (APK)). When the display 100 is activated, the processing apparatus 110 automatically executes the machine learning model to identify one or more objects existing in each frame.

Next, in Step S215, the processing apparatus 110 obtains at least one block corresponding to at least one object in each frame according to the frames of the image, and identifies object information in each block. Here, the object information includes an object type, reference point coordinates, and a frame time. The object type may be "human being", "vehicle", "animal", etc. After the processing apparatus 110 finds out the object existing in each frame, a block of an appropriate size is correspondingly divided. Here, the size of the block may be the minimum range surrounding the object. In an embodiment, after the processing apparatus 110 detects the object through the machine learning model, a rectangular bounding box is used to mark the position of the detected object in the frame. The range selected by the bounding box may be regarded as the block corresponding to the object. In addition to being rectangular, the block may also be circular, elliptical, or irregular. After obtaining the bounding box, the processing apparatus 110 obtains the corresponding object information based on the bounding box. Please refer to FIG. 3A and FIG. 3B for specific explanation.

Figure 3A:
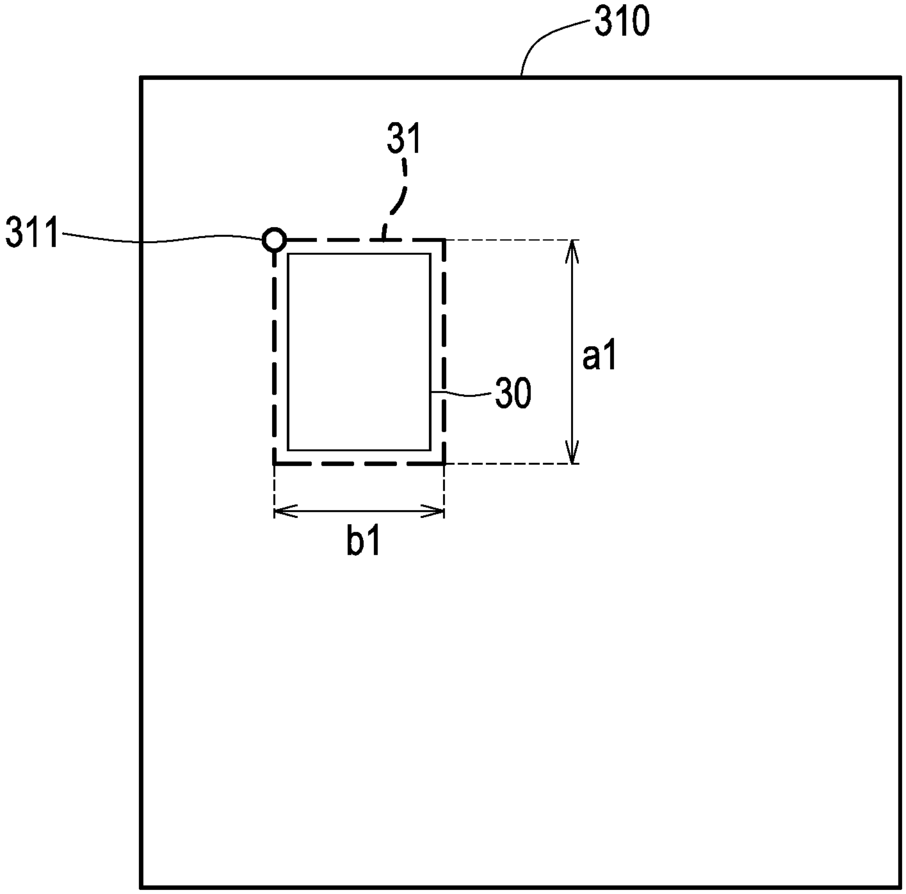
FIG. 3A and FIG. 3B are respectively schematic diagrams of a processing apparatus identifying object information of a first frame and a second frame according to an embodiment of the disclosure.
Figure 3B:
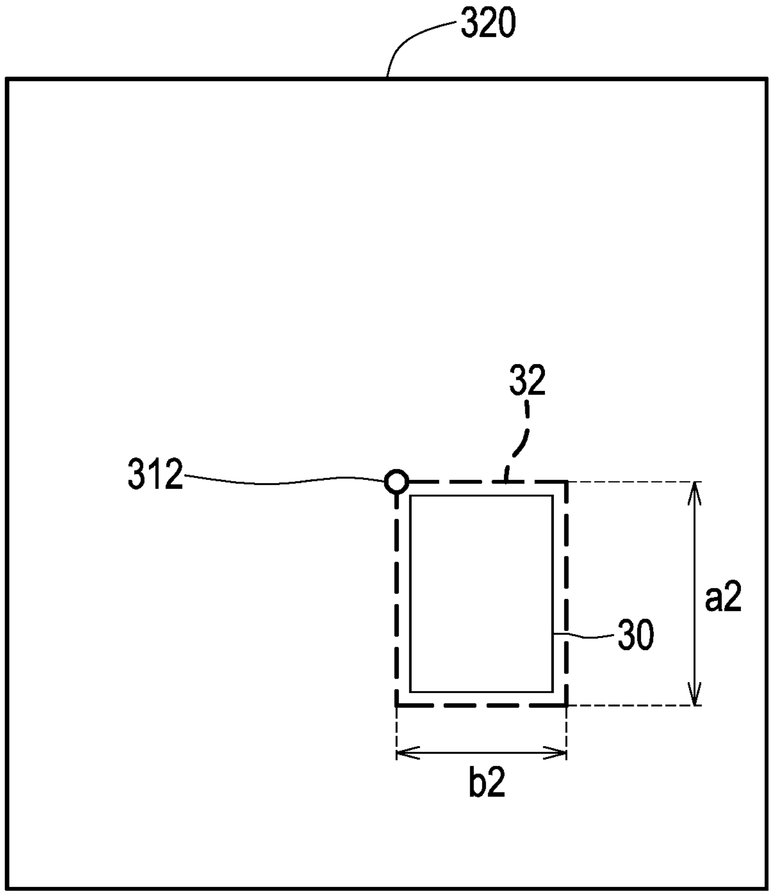

FIG. 3A and FIG. 3B are respectively schematic diagrams of a processing apparatus identifying object information of a first frame and a second frame according to an embodiment of the disclosure. In the embodiment, FIG. 3A shows a first frame 310 and FIG. 3B shows a second frame 320. The first frame 310 is obtained at a frame time T1, the second frame 320 is obtained at a frame time T2, the same object 30 exists in the first frame 310 and the second frame 320, and the object 30 moves in a time period between the frame time T1 and the frame time T2. In the first frame 310, the object 30 is selected with a bounding box 31 with a length al and a width b1. In the second frame 320, the object 30 is selected with a bounding box 32 with a length a2 and a width b2.

The processing apparatus 110 respectively selects a specific point on the bounding box 31 of the first frame 310 and the bounding box 32 of the second frame 320 as a reference point, and the specific point may be, for example, located at or around the geometric center of the bounding box 31. As shown in FIG. 3A and FIG. 3B, in the case where the shapes of the bounding boxes 31 and 32 are rectangular (rectangular blocks), the processing apparatus 110 respectively uses points 311 and 312 at the upper left corners of the bounding boxes 31 and 32 as the reference points, and records the X and Y coordinate values (the reference point coordinates) of the reference points in the frame in the corresponding object information. For example, in the object information corresponding to the object 30 in the first frame 310, the point 311 at the upper left corner of the bounding box 31 is used as the reference point, and the X and Y coordinate values (X1, Y1) of the point 311 in the first frame 310 are recorded. In the object information corresponding to the object 30 in the second frame 320, the point 312 at the upper left corner of the bounding box 32 is used as the reference point, and the X and Y coordinate values (X2, Y2) of the point 312 in the second frame 320 are recorded.

In other embodiments, in the case where the shape of the bounding box is circular (circular block), the processing apparatus 110 uses the center of the circular block as the reference point, and records the X and Y coordinate values (the reference point coordinates) of the reference point in the frame in the corresponding object information. In the case where the shape of the bounding box is elliptical (elliptical block), the processing apparatus 110 uses the center of the elliptical block as the reference point, and records the X and Y coordinate values (the reference point coordinates) of the reference point in the frame in the corresponding object information. In the case where the shape of the block is irregular (irregular block), the processing apparatus 110 executes edge detection on the irregular block to find the outline thereof, thereby extracting multiple points on the outline as the reference points, and recording the X and Y coordinate values (the reference point coordinates) of the reference points in the frame in the reference point coordinates of the corresponding object information.

After obtaining the block corresponding to the object, the processing apparatus 110 may further mark each block with the corresponding object type through the machine learning model. For example, the machine learning model is a multi-category classifier, which may identify and classify various objects. After identifying the object and obtaining the object type thereof, the object type of each block is marked.

After that, in Step S220, the processing apparatus 110 obtains the number of a target object according to the object type. Here, the target object corresponding to the object type of the object is a target type. In an embodiment, if the target type is "human being", the processing apparatus 110 calculates the number of the object whose object type is labeled as "human being" as the number of the target object.

In an embodiment, the calculation of the number of the target object may be set as follows. The processing apparatus 110 further sets a detection area within an imaging range of the image sensor 120, and the range of the detection area is smaller than or equal to the range of the frame. For example, in the embodiment shown in FIG. 3A and FIG. 3B, the range of the detection area is equal to the range of the frame, that is, the range of the first frame 310 and the second frame 320. The processing apparatus 110 receives the image information from the image sensor 120 every second, and then uses the machine learning model to detect the position of the target object. After the processing apparatus 110 detects that the object is the target object through the machine learning model, and the position of the target object enters the detection area, tracking starts, and the number of the target object is increased by 1. When the processing apparatus 110 detects that the position of the target object is no longer within the detection area through the machine learning model, tracking stops, and the number of the target object is decreased by 1.

After that, in Step S225, the processing apparatus 110 calculates a moving speed of each target object according to the frame time and the reference point coordinates. The processing apparatus 110 reads the object information of the same target object in different frames to obtain at least two frame times and at least two reference point coordinates of the target object in different frames. In the embodiment shown in FIG. 3A and FIG. 3B, the frame time of the first frame 310 of FIG. 3A is, for example, T1, and the reference point coordinates of the target object are (X1, Y1). The frame time of the second frame 320 of FIG. 3B is, for example, T2, and the reference point coordinates of the target object are (X2, Y2). Accordingly, the processing apparatus 110 calculates moving times of at least two frame times, calculates displacement distances of at least two reference point coordinates, and calculates the moving speed of the target object with the moving times and the displacement distances.

After that, in Step S230, the processing apparatus 110 controls the brightness of the light source 130 of the display 100 according to the number of the target object and the moving speed of each target object. In an embodiment, the storage 140 may store at least one set of limiting conditions. The limiting condition may include a speed range of the moving speed and a minimum number restriction. The minimum number restriction is used to limit the number of the target object. For example, the number of the target object must be greater than or equal to 1. The speed range is used to limit the moving speed of the target object. For example, the movement speed is greater than or equal to 1 m/s and less than or equal to 2 m/s. The processing apparatus 110 determines whether the number and the moving speed satisfy the limiting condition. For example, the processing apparatus 110 determines whether the number of the target object is greater than or equal to the minimum number restriction and whether the moving speed is within the speed range. Here, after calculating the moving speeds of each target object between any two frames, the processing apparatus 110 then calculates an average speed of the moving speeds as the moving speed for final determination. If the number of the target object is greater than or equal to the minimum number restriction and the moving speed is within the speed range, it is determined that the limiting condition is met. If the number of the target object is not greater than the minimum number restriction or the moving speed is not within the speed range, it is determined that the limiting condition is not met.

In addition, the limiting condition may be set as follows. If the number of the target object is greater than or equal to the minimum number restriction and the moving speed of one or N (N may be an integer greater than or equal to 2) of the target objects is within the speed range, it is determined that the limiting condition is met. If the number of the target object is not greater than the minimum number restriction or the moving speeds of all the target objects are not within the speed range, it is determined that the limiting condition is not met.

The processing apparatus 110 increases the brightness of the light source 130 in response to the limiting condition being satisfied. For example, the brightness of the light source 130 may be defined as levels 0 to 100 from the darkest to the brightest. For example, the processing apparatus 110 may gradually adjust the brightness of the light source 130 from level 0 to level 70 to produce a visual attraction effect. When the processing apparatus 110 decreases the brightness of the light source 130 (a low power consumption mode) in response to the limiting condition not being satisfied, the processing apparatus 110 gradually adjusts the brightness from level 70 to level 10, so as to reduce energy consumption and increase the service life of the display 100. In addition, the processing apparatus 110 may also adjust the brightness of the light source 130 to the lowest brightness or directly shut down the light source 130.

In another embodiment, the object information may also include the length of the block (for example, the lengths a1 and a2 of the bounding boxes shown in FIG. 3A and FIG. 3B). The limiting condition may also include a height restriction. The height restriction may be greater than or equal to or less than or equal to a certain height or a certain height range. For example, if a target audience of certain information is children whose stature is less than or equal to 140 cm, the limiting condition may be set as at least one person whose stature is less than or equal to 140 cm. Referring to FIG. 3A, the processing apparatus 110 may calculate the height of the object 30 (the target object) according to a proportional relationship between the length a1 and the first frame 310. After that, the processing apparatus 110 controls the brightness of the light source 130 of the display 100 according to the number of the target object and the height and the moving speed of each target object. In the case where the number satisfies the minimum number restriction, the moving speed satisfies the speed range, and the height satisfies the height restriction, it is determined that the limiting condition is satisfied. In the case where at least one of the minimum number restriction, the speed range, and the height restriction is not satisfied, it is determined that the limiting condition is not satisfied.

In another embodiment, the object information may further include color information of the block. The limiting condition may also include a color restriction. The processing apparatus 110 may further identify the color information of the block corresponding to each target object. Specifically, as shown in FIG. 3A, the object information further includes the length and the width of the block. Here, the length and the width of the block are the length a1 and the width b1 of the bounding box 31. The processing apparatus 110 identifies the color information of the block corresponding to the target object according to the range of the length a1 and the width b1 of the bounding box 31 corresponding to the object 30 (the target object). The color information is, for example, the clothing color of a human being or the exterior color of a car. After that, the processing apparatus 110 controls the brightness of the light source 130 of the display 100 according to the number of the target object and the moving speed and the color information of each target object. For example, if a target audience of an advertisement has a high probability of wearing white clothing, the limiting condition is set as the target object is a human being, the minimum number of the human being is 1, the moving speed is less than 2 m/s, and the clothing color of at least one person is white. In the case where the minimum number restriction, the speed range, and the color restriction are all satisfied, it is determined that the limiting condition is satisfied. In the case where at least one of the minimum number restriction, the speed range, and the color restriction is not satisfied, it is determined that the limiting condition is not satisfied. In another embodiment, the object information may also include an ambient volume.

The limiting condition may also include a volume restriction. The volume restriction may be greater than or equal to or less than or equal to a certain volume (decibel) or a certain volume range. The display 100 receives sound data through a sound sensor, and calculates the ambient volume through the processing apparatus 110 according to the sound data. Afterwards, the processing apparatus 110 controls the brightness of the light source 130 of the display 100 according to the number of the target object, the moving speed of each target object, and the ambient volume. For example, the volume restriction is greater than or equal to 80 decibels. In the case where the minimum number restriction, the speed range, and the volume restriction are all satisfied, it is determined that the limiting condition is satisfied. In the case where at least one of the minimum number restriction, the speed range, and the volume restriction is not satisfied, it is determined that the limiting condition is not satisfied.

In another embodiment, the object information includes the object type, the reference point coordinates, the frame time, the length and the width of the block, the color information, and the ambient volume. The processing apparatus 110 controls the brightness of the light source 130 of the display 100 based on the number, the moving speed, the height, the color information, and the ambient volume.

In an embodiment, the limiting condition may be set through a cloud server, and the limiting condition is transmitted to each display 100 by a push notification. The display 100 may determine the content of the object information that the processing apparatus 110 needs to record according to the limiting condition.

Figure 4:
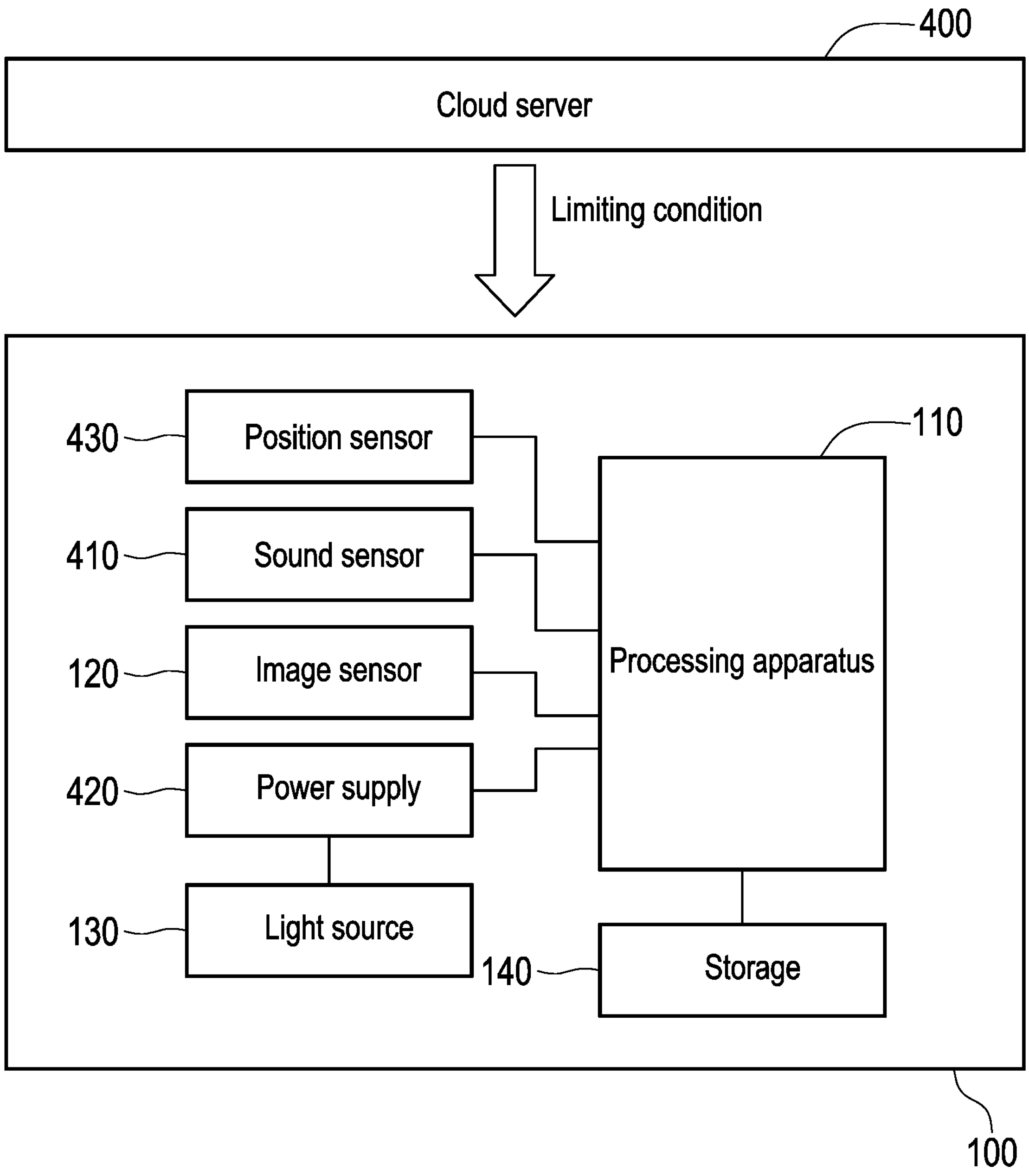
FIG. 4 is a block diagram of a display system according to another embodiment of the disclosure.

FIG. 4 is a block diagram of a display system according to another embodiment of the disclosure. The display system shown in FIG. 4 includes a cloud server 400 and at least one display 100. The cloud server 400 is used to set the at least one limiting condition and make a push notification to the display 100. In FIG. 4, the display 100 is further provided with a sound sensor 410, a power supply 420, and a position sensor 430. The sound sensor 410 is used to receive the sound data. The sound sensor 410 is, for example, a microphone or a decibel sensor. The position sensor 430 is, for example, a device adopting a global positioning system (GPS) to obtain the current position of the display 100.

The power supply 420 is used to supply power to the light source 130. Specifically, the processing apparatus 110 sends a dimming command to the power supply 420, so that the power supply 420 controls the brightness of the light source 130. Here, the dimming command depends on the number and the moving speed of the target object.

In addition, the processing apparatus 110 may further send a shutdown command to the power supply 420 according to at least one of the number of the target object and the frame time, so that the power supply 420 stops supplying power to the light source 130 to shut down the light source 130. For example, the processing apparatus 110 sends the shutdown command to the power supply 420 to shut down the light source 130 when determining that the current time exceeds a specified working time interval based on the frame time. That is, when the current time is not within the working time interval, the processing apparatus 110 actively shuts down the light source 130. Alternatively, the processing apparatus 110 may also be set to actively shut down the light source 130 in the case where the number of the target object is determined to be 0.

For example, assuming that the cloud server 400 makes a push notification to transmit a set of limiting conditions set for different positions as shown in Table 1 to the display 100, the processing apparatus 110 is further set to record the identified object type, block size (for example, the length and the width of the rectangular block; the radius of the circular block; the major axis and the minor axis of the elliptical block), color information, ambient volume, and the position of the display 100 after identifying each object in each frame.

As shown in Table 1, limiting conditions A to C respectively correspond to three places, that is, a conference room, a library, and a commercial building lobby. Items of the limiting conditions A to C include the working time interval, the minimum number restriction, the height restriction, the speed range, the volume restriction, and the color restriction.

TABLE 1

| Item of limiting condition | Limiting condition A: conference room | Limiting condition B: library | Limiting condition C: commercial building lobby |
|---|---|---|---|
| Working time interval | 10:00-18:00 | 10:00-18:00 | 8:00-18:00 |
| Minimum number restriction | >2 | >10 | >2 |
| Height restriction | >150 cm | >178 cm | >160 cm |
| Speed range | <1 m/s | <1 m/s | <1 m/s |
| Volume restriction | <80 decibels | No restriction | <80 decibels |
| Color restriction | White | Black | White |

The processing apparatus 110 is used to determine the current position of the display 100 to determine which limiting condition to adopt. Moreover, the processing apparatus 110 determines whether to adjust the brightness of the light source 130 according to the current time, the number of the identified target object, the moving speed, the height, the color information, and the ambient volume.

In terms of the limiting condition A, assuming that the current time is within the working time interval, the number of the detected target objects must be greater than 2, and in the case where the height (for example, the stature) of at least one of the target objects exceeds 150 cm, the average moving speed of all the target objects is less than 1 m/s, the ambient volume is less than 80 decibels, and the color of at least one of the target objects is white, it is determined that the limiting condition A is satisfied. If one of the items is not met, it is determined that the limiting condition A is not satisfied.

In the case where the display 100 is located in the conference room, if the current time, the number of the target object, the moving speed, the height, the color information, and the ambient volume all satisfy the limiting condition A, the processing apparatus 110 sends the dimming command for increasing the brightness to the power supply 420, so that the power supply 420 control the brightness of the light source 130 to be increased. If the current time is within the working time interval, and at least one of the number of the target object, the moving speed, the height, the color information, and the ambient volume does not satisfy the limiting condition A, the processing apparatus 110 sends the dimming command for decreasing the brightness to the power supply 420, so that the power supply 420 control the brightness of the light source 130 to be decreased (not yet shut down). When the current time is not within the working time interval, the processing apparatus 110 sends the shutdown command to the power supply 420, so that the power supply 420 stops supplying power to the light source 130 to shut down the light source 130. The limiting conditions B and C may be deduced by analogy.

In summary, in the embodiments of the disclosure, the brightness of the light source may be dynamically adjusted according to the presence or the absence of the target object and whether the moving speed, etc. satisfies the limiting condition, that is, the light source is adjusted to improve the attraction effect in the case where the limiting condition is satisfied, and the light source enters a power saving mode in the case where the limiting condition is not satisfied. In addition, it may be further set to actively shut down the light source outside the working time interval. In this way, it is possible to actively attract passers-by to stop when necessary, and to reduce energy consumption by switching to the low power consumption mode to increase the service life of the display. Moreover, since the processing apparatus of the embodiments of the disclosure identifies the features of the object in the frame through the machine learning model, instead of facial recognition as in the prior art, the processing apparatus of the embodiments of the disclosure does not need to collect facial information, which protects the privacy of human beings, and due to the huge data amount of the facial information, the embodiments of the disclosure can greatly reduce the computation amount of the processing apparatus to reduce the processing time of the processing apparatus, so that the display can project multimedia content in real time.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A method for controlling a display, suitable for being executed by a processing apparatus of the display, the method for controlling the display comprising:

receiving image information and generating an image according to the image information, wherein the image has a plurality of frames;

analyzing the image to determine whether there is at least one object in the image;

obtaining at least one block corresponding to the at least one object in each of the frames according to the frames of the image, and identifying object information in each of the at least one block, wherein the object information comprises an object type, a reference point coordinate, and a frame time;

obtaining a number of at least one target object according to the object type;

calculating a moving speed of each of the at least one target object according to the frame time and the reference point coordinate; and controlling brightness of a light source of the display according to the number and the moving speed.

2. The method for controlling the display according to claim 1, wherein after obtaining the at least one block corresponding to the at least one object in each of the frames, the method further comprises:

marking the object type of the at least one block.

3. The method for controlling the display according to claim 1, further comprising:

identifying color information of the at least one block corresponding to each of the at least one target object; and controlling the brightness of the light source of the display according to the color information.

4. The method for controlling the display according to claim 1, wherein the object information further comprises a length of the at least one block, the method for controlling the display further comprising:

calculating a height of each of the at least one target object according to the length of the at least one block corresponding to each of the at least one target object; and controlling the brightness of the light source of the display according to the height.

5. The method for controlling the display according to claim 1, further comprising:

receiving sound data through a sound sensor;

calculating an ambient volume according to the sound data through the processing apparatus; and controlling the brightness of the light source of the display according to the ambient volume.

6. The method for controlling the display according to claim 1, wherein the step of controlling the brightness the light source of the display further comprises:

determining whether the number and the moving speed satisfy a limiting condition;

increasing the brightness of the light source in response to the limiting condition being satisfied; and decreasing the brightness of the light source in response to the limiting condition not being satisfied, wherein the limiting condition comprises a speed range of the moving speed and a minimum number restriction of the number.

7. The method for controlling the display according to claim 1, wherein the step of controlling the brightness of the light source of the display comprises:

sending a dimming command to a power supply, so that the power supply controls the brightness of the light source, wherein the dimming command depends on the number and the moving speed.

8. The method for controlling the display according to claim 7, further comprising:

sending a shutdown command to the power supply according to at least one of the number of the at least one target object and the frame time, so that the power supply stops supplying power to the light source to shut down the light source.

9. The method for controlling the display according to claim 1, wherein the object information further comprises a length and a width of the at least one block, the method for controlling the display further comprising:

calculating a height of each of the at least one target object according to the length of the at least one block corresponding to each of the at least one target object;

identifying color information of the at least one block corresponding to each of the at least one target object according to the reference point coordinate, the length, and the width;

calculating an ambient volume according to sound data; and controlling the brightness of the light source of the display according to the number, the moving speed, the height, the color information, and the ambient volume.

10. A display, comprising:

an image sensor, configured to generate image information;

a light source; and a processing apparatus, coupled to the image sensor and the light source, wherein the processing apparatus is configured to receive the image information and generate an image according to the image information, the image has a plurality of frames, the processing apparatus is configured to analyze the image of the image information to determine whether there is at least one object in the image, the processing apparatus is configured to obtain at least one block corresponding to the at least one object in each of the frames according to the frames of the image, and identify object information in each of the at least one block, wherein the object information comprises an object type, a reference point coordinate, and a frame time, the processing apparatus is configured to obtain a number of at least one target object according to the object type, the processing apparatus is configured to calculate a moving speed of each of the at least one target object according to the frame time and the reference point coordinate, and the processing apparatus is configured to control brightness of the light source according to the number and the moving speed of the at least one target object.

11. The display according to claim 10, wherein the processing apparatus is configured to mark the object type of the at least one block.

12. The display according to claim 10, wherein the processing apparatus is configured to identify color information of the at least one block corresponding to each of the at least one target object, and control the brightness of the light source of the display according to the color information.

13. The display according to claim 10, wherein the object information further comprises a length of the at least one block, the processing apparatus is configured to calculate a height of each of the at least one target object according to the length of the at least one block corresponding to each of the at least one target object, and control the brightness of the light source according to the height.

14. The display according to claim 10, further comprising:

a sound sensor, configured to receive sound data;

wherein the processing apparatus is configured to calculate an ambient volume according to the sound data, and control the brightness of the light source according to the ambient volume.

15. The display according to claim 10, wherein the processing apparatus is configured to execute:

determining whether the number and the moving speed satisfy a limiting condition;

increasing the brightness of the light source in response to the limiting condition being satisfied; and decreasing the brightness of the light source in response to the limiting condition not being satisfied, wherein the limiting condition comprises a speed range of the moving speed and a minimum number restriction of the number.

16. The display according to claim 10, wherein the processing apparatus is configured to send a dimming command to a power supply, so that the power supply controls the brightness of the light source, wherein the dimming command depends on the number and the moving speed.

17. The display according to claim 16, wherein the processing apparatus is configured to send a shutdown command to the power supply according to at least one of the number of the at least one target object and the frame time, so that the power supply stops supplying power to the light source to shut down the light source.

18. The display according to claim 10, wherein the object information further comprises a length and a width of the at least one block, and the processing apparatus is configured to execute:

calculating a height of each of the at least one target object according to the length of the at least one block corresponding to each of the at least one target object;

identifying color information of the at least one block corresponding to each of the at least one target object according to the reference point coordinate, the length, and the width;

calculating an ambient volume according to sound data; and controlling the brightness of the light source of the display according to the number, the moving speed, the height, the color information, and the ambient volume.

19. A display system, comprising:

a cloud server, configured to set at least one limiting condition and make a push notification to transmit the at least one limiting condition; and at least one display, configured to receive the at least one limiting condition, the at least one display comprising:

an image sensor, configured to generate image information;

a light source; and a processing apparatus, coupled to the image sensor and the light source, wherein the processing apparatus is configured to receive the image information and generate an image according to the image information, the processing apparatus is configured to analyze the image of the image information to determine whether there is at least one object in the image, the processing apparatus is configured to obtain at least one block corresponding to the at least one object in each of the frames according to the frames of the image, and identify object information in each of the at least one block, wherein the object information comprises an object type, a reference point coordinate, and a frame time, the processing apparatus is configured to obtain a number of at least one target object according to the object type, the processing apparatus is configured to calculate a moving speed of each of the at least one target object according to the frame time and the reference point coordinate, and the processing apparatus is configured to control brightness of the light source according to the number and the moving speed of the at least one target object.

* * * * *